United States Patent [19]

Nakatani et al.

[11] Patent Number: 4,757,343

[45] Date of Patent: Jul. 12, 1988

[54] ELECTROSTATIC IMAGE OUTPUT APPARATUS

[75] Inventors: Kaname Nakatani, Osaka; Yoshiaki Kato, Ikaruga, both of Japan

[73] Assignee: Mita Industrial Co., Ltd., Osaka, Japan

[21] Appl. No.: 802,445

[22] Filed: Nov. 27, 1985

[30] Foreign Application Priority Data

Nov. 30, 1984 [JP] Japan ................................ 59-251656

[51] Int. Cl.$^4$ ...................... G03G 15/00; G01D 15/06

[52] U.S. Cl. ............................... 355/3 CH; 346/153.1

[58] Field of Search .................. 358/296, 300; 357/30, 357/31, 32; 346/153.1, 154, 155, 159, 160; 355/3 CH, 14 CH

[56] References Cited

U.S. PATENT DOCUMENTS

| | | | |
|---|---|---|---|
| 3,518,698 | 9/1966 | Kazan et al. | 346/153.1 |
| 3,979,757 | 9/1976 | Kilby et al. | 346/155 |
| 3,979,758 | 9/1976 | Kilby et al. | 346/155 |
| 4,005,436 | 1/1977 | Kleinknecht et al. | 346/155 |
| 4,448,867 | 5/1984 | Ohkubo et al. | 346/154 X |
| 4,457,993 | 7/1984 | Nishikawa | 355/3 CH X |

FOREIGN PATENT DOCUMENTS 50458 4/1984 Japan .

*Primary Examiner*—A. T. Grimley
*Assistant Examiner*—Ed Pipala
*Attorney, Agent, or Firm*—Sherman & Shalloway

[57] ABSTRACT

Disclosed is an electrostatic image output apparatus comprising a layer composed of a dielectric material or a photoconductor, image element electrodes arranged in the form of a matrix on one surface of said layer, field effect transistors affiliated with the image element electrodes and interposed between the image element electrodes and the earth, and a charging mechanism arranged on the other surface of the dielectric material or photoconductor layer.

In this electrostatic image output apparatus, an electrostatic image having a high surface potential and a high potential contrast can be formed by an electric signal of a very small output and therefore, an image excellent in the image quality and density can be obtained without tailing or shadowing.

4 Claims, 2 Drawing Sheets

ELECTROSTATIC IMAGE OUTPUT APPARATUS

BACKGROUND OF THE INVENTION (1) Field of the Invention

The present invention relates to an electrostatic image output apparatus. More particularly, the present invention relates to an electrostatic image output apparatus in which an electrostatic image can be formed by a digital signal without optical scanning.

(2) Description of the Prior Art

An electrophotographic process in generally used for forming an electrostatic image. For example, a photosensitive plate having a photoconductive layer is uniformly corona-charged and the plate is exposed imagewise to light by optical scanning to form an electrostatic image corresponding to the original image. Then, this electrostatic image is developed with toners charged with a polarity reverse to the polarity of the electrostatic image and the toner image is transferred to a copy sheet to obtain a print. Optical scanning exposure is indispensable for the electrophotography, and the sensitivity is limited because of the photoconductive layer used. Accordingly, the electrophotographic process is still insufficient in that the speed of forming prints cannot be highly increased.

As the conventional method for forming an electrostatic latent image based on electric signals, there is known an electric recording method in which a dielectric material is used for the recording layer, a needle electrode and a confronting electrode are arranged so that the dielectric recording layer is sandwiched between the two electrodes, and a recording signal is applied between the two electrodes. This method, however, has a defect concerning the image quality. For example, tailing is readily caused. Therefore, this recording method is not widely adopted at the present.

SUMMARY OF THE INVENTION

It is therefore a primary object of the present invention to provide an electrostatic image output apparatus in which an electrostatic image having a high quality can be obtained without performing optical scanning or carrying out an on/off operation directly on a charging mechanism.

Another object of the present invention is to provide an electrostatic image output apparatus comprising an active matrix having field effect transistors (FET) built therein.

More specifically, in accordance with the present invention, there is provided an electrostatic image output apparatus comprising a layer composed of a dielectric material or a photoconductor, image element electrodes arranged in the form of a matrix on one surface of said layer, field effect transistors affiliated with the image element electrodes and interposed between the image element electrodes and the earth, and a changing mechanism arranged on the other surface of the dielectric material or photoconductor layer.

Figure 1:
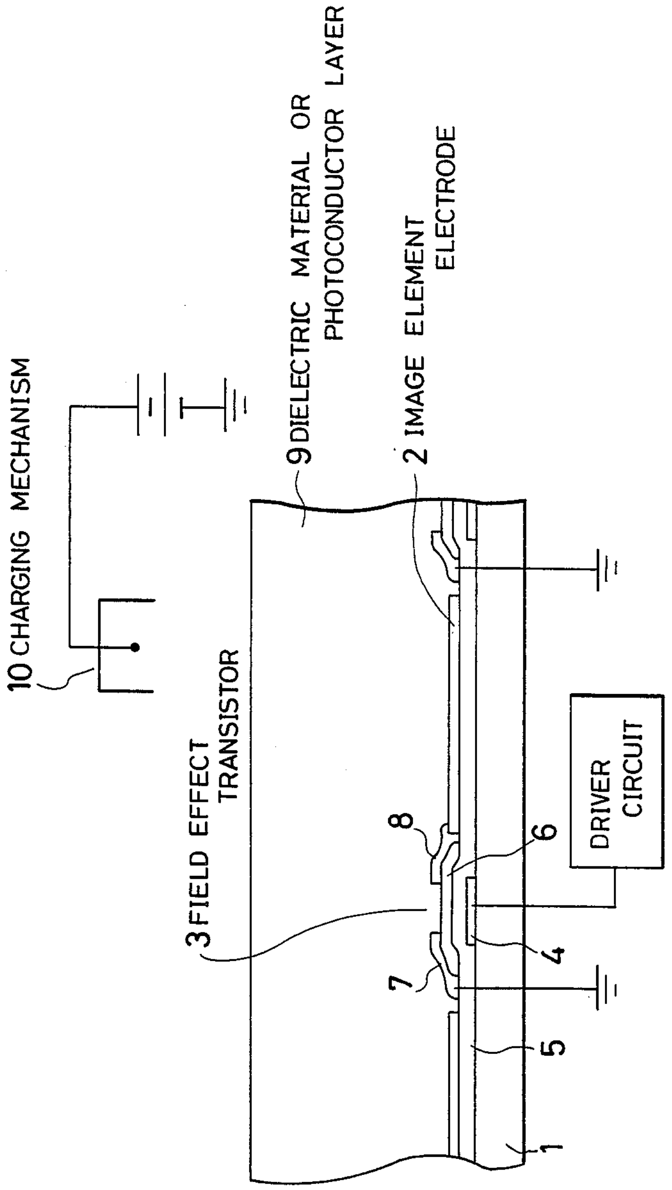
FIG. 1 is an enlarged sectional diagram illustrating the sectional structure of the electrostatic image output apparatus according to the present invention.

In the drawings, reference numerals 2, 3, 9 and 10 represent an image element electrode, a field effect transistor, a dielectric material or photoconductor layer and a charging mechanism, respectively.

DETAILED DESCRIPTION OF THE PREFERRED EMBODIMENTS

The present invention will now be described in detail with reference to the embodiments illustrated in the accompanying drawings.

Referring to FIG. 1 illustrating the sectional structure of the image output apparatus according to the present invention, on one surface of a substrate 1, image element electrodes 2 are arranged in the form of a matrix, and field effect transistors represented as a whole by reference numeral 3 are arranged. The field effect transistors 3 comprise, for example, a gate electrode 4 formed on the substrate 1, a gate insulating film 5 covering the substrate 1 and the gate electrode 4 formed on the substrate 1, said insulating film 5 being composed of, for example, $\alpha$-$Si_3N_4$:H, a semiconductor 6 such as $\alpha$-Si:H formed on the gate insulating film 5 to correspond to the gate electrode 4, a source electrode 7 connected to one end of the semiconductor 6, and a drain electrode 8 connected to the other end of the semiconductor 6.

The image element electrodes 2 are arranged on the insulating film 5 so that they are connected to the drain electrode 8. The source electrode 7 is earthed. Accordingly, the field effect transistors 3 are interposed between the image element electrodes 2 and the earth. The gate electrode 4 is connected to a known vertical scanning circuit (driver circuit), though it is not shown in the drawings.

A continuous layer 9 of a dielectric material or a photoconductor is formed to entirely cover the image element electrodes 2 and the field effect transistors 3. A charging mechanism 10 such as a corona discharge mechanism is arranged on this dielectric material or photoconductor layer 9.

The principle of the formation of an image in the apparatus having the above-mentioned structure will now be described.

Figure 2:
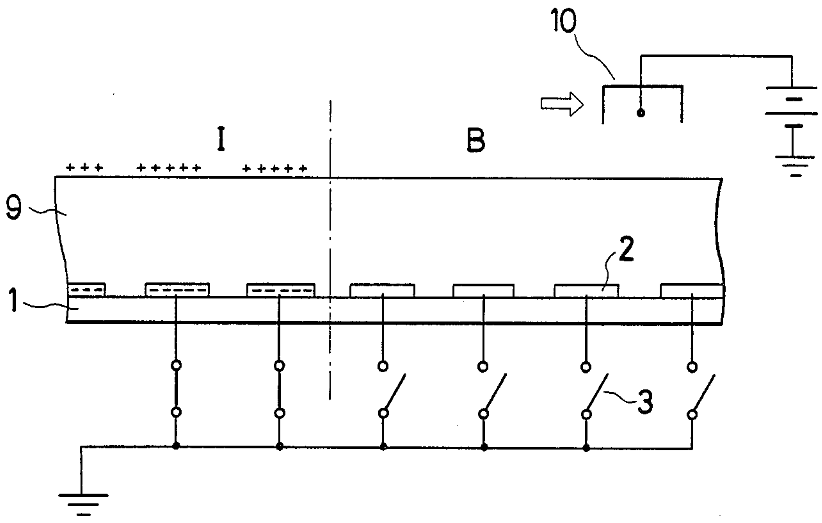
FIG. 2 is a diagram illustrating the operation principle of the apparatus shown in FIG. 1.

Referring to FIG. 2 illustrating the principle of the formation of an image in the image output apparatus according to the present invention and FIG. 1, the field effect transistor (FET) 3 is shown as a switching element. Synchronously with the operation of the corona charger 10, an electric signal from the driver circuit is put in the gate electrode 4 of the field effect transistor 3. By this electric signal, the field effect transistor 3 is rendered conductive between the source electrode 7 and the drain electrode 8 through the semiconductor 6, and the earthed state (ON state) and the non-earthed state (OFF state) are formed among the image element electrodes 2. On the surface I of the dielectric material or photoconductor layer 9 where the image element electrodes are earthed, charging is effectively performed because a charge of a polarity reverse to the polarity of the charge, for example, the positive charge, of the corona charger 10, for example, a negative charge, is induced. On the other hand, on the surface B of the dielectric material or photoconductor layer 9 where the image element electrodes 2 are in the non-earthed state, charging is not substantially performed. As the result, an electrostatic image of a high potential contrast corresponding to the earthing (ON) of the image element electrodes and the non-earthing (OFF) of the image element electrodes can be formed.

Figure 3:
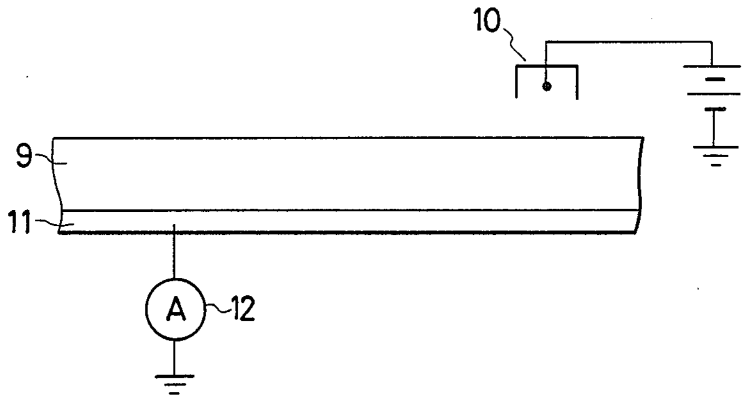
FIG. 3 is a diagram illustrating the principle of the measurement of the running electric current.

In order to perform the corona discharging on the dielectric material or photoconductor layer and form an electrostatic latent image that can be developed with toners, it is sufficient if there is a running electric current of 2 $\mu A/cm^2$. By the term "running electric current" used herein is meant a current running through an ampere meter 12 when in FIG. 3, the dielectric material or photoconductor layer 9 is formed on an electrode 11, the electrode 11 is earthed through the ampere meter 12, the corona charger 10 is arranged on the dielectric material or photoconductor layer 9 and the corona discharging is carried out. If the size of the image element electrode is 200 $\mu m \times 200$ $\mu m$, the running electric current into the image element electrode is of an order of $10^{-3}$ $\mu A$, and the on/off current of the field effect transistor is of an order of $10^{-6}$ to 1 $\mu A$. Accordingly, it will be readily understood that earthing/non-earthing switching can be accomplished.

According to the present invention, by using the above-mentioned image element electrode and field effect transistor (FET) in combination, an electrostatic image having a high surface potential and a high potential contrast can be formed by an electric signal of an extremely small output. Furthermore, since this combination of the image element electrode and field effect transistor is very fine and its electrostatic capacitance is very small, an image excellent in the image quality and density can be obtained without occurrence of troubles caused in the ordinary electric recording method, such as tailing and shadowing.

In the apparatus of the present invention, as the substrate 1, there can be used a glass sheet, a plastic sheet or film, a ceramic plate and an insulaing resin-coated metal plate. The field effect transistor may be formed from a known material according to known procedures.

The image element electrode 2 is formed of an electroconductive metal such as aluminum, silver, gold, tin or copper, and it is ordinarily formed by vacuum deposition of such a metal. It is preferred that the shape of the image element electrode be a square shape, but it may have a circular, triangular or hexagonal shape or other optional shape. It is generally preferred that the diameter or one side of the image element electrode be 10 to 1000 $\mu m$.

A polymeric dielectric material, for example, a thermoplastic polyester such as polyethylene terephthalate, a polycarbonate, an acrylic resin, a polystyrene resin, a epoxy resin, a silicone resin or a polyurethane resin may be used as the dielectric material. As the photoconductor, there can be mentioned inorganic photoconductors such as amorphous selenium, amorphous silicon, selen-tellurium, selen-arsenic, cadmium sulfide, selen sulfide and tellurium sulfide, and organic polymeric photoconductors such as polyvinylcarbazole. Moreover, a composition formed by dispersing an inorganic photoconductor as mentioned above or an organic photoconductor such as a phthalocyanine pigment, a perylene pigment, a quinacridone pigment, a pyranthrone pigment or a polyazo pigment into a polymeric dielectric material may be used.

In the present invention, if a photoconductive layer is used as the layer covering the image element electrode, there can be attained an advantage that if the output apparatus is exposed to light after formation of an electrostatic image, the residual charge can be erased simply and easily.

The photoconductive layer that can be used is not limited to those mentioned above. As another example, there can be mentioned a layer of a dispersion of a photoconductor as mentioned above as a charge-generating pigment in a continuous phase of a charge-transporting substance, and a photoconductive layer having a laminate structure comprising a chargegenerating layer and a charge-transporting layer formed thereon.

It is preferred that the thickness of the dielectric material or photoconductor layer be 0.1 to 200 $\mu m$, especially 2 to 30 $\mu m$, though the preferred thickness differs to some extent according to the potential of the electrostatic image.

Formation of an electrostatic image in the apparatus of the present invention can be carried out according to the above-mentioned principle. The function of the field effect transistor is generally exerted by application of a voltage of several volts to scores of volts, though the applied voltage is changed to some extent according to the kind of the semiconductor used.

A direct current power source of 3.5 to 8.0 KV may be used for the surface charging by the corona charging mechanism, whereby an electrostatic image having a surface potential of 50 to 2000 V can be formed.

In order to take out this electrostatic image in the form of a visible image, the electrostatic image is developed with a toner having a polarity reverse to the polarity of the electrostatic image and the formed toner image is transferred and fixed onto an appropriate transfer sheet. Thus, a print having a visible image can be obtained. Furthermore, there may be adopted a method in which the above-mentioned electrostatic image is transferred on other dielectric material and post treatments such as development and fixation are carried out in the same manner as described above.

What is claimed is:

1. An electrostatic image output apparatus comprising a layer composed of a dielectric material or a photoconductor, image element electrodes arranged in the form of a matrix on one surface of said layer, field effect transistors affiliated with the image element electrodes and interposed between the image element electrodes and the earth, and a corona charging mechanism arranged on the other surface of the dielectric material or photoconductor layer.

2. An image output apparatus as set forth in claim 1, wherein the diameter or one side of the image element electrode is 10 to 1000 $\mu m$.

3. An image output apparatus as set forth in claim 1, wherein the thickness of the dielectric material or photoconductor layer is 0.1 to 200 $\mu m$.

4. An electrophotographic process for forming an electrostatic image on a dielectric or photoconductive recording layer which comprises:

providing a matrix of image element electrodes on one surface of said recording layer and a corresponding matrix of field effect transistors for selectively connecting selected ones of said image element electrodes to ground, applying a corona discharge of given polarity to the opposite surface of said recording layer and simultaneously with said charging, electrically activating selected ones of said matrix of field effect transistors, said selected ones corresponding to the electrostatic image to be formed, so that the selectively activated ones of said array of field effect transistors induce a charge of opposite polarity to the corona discharge to be formed in the corresponding ones of the image element electrodes, whereby an electrostatic image is formed by the charged image element electrodes.

* * * * *

UNITED STATES PATENT AND TRADEMARK OFFICE
CERTIFICATE OF CORRECTION

PATENT NO. : 4,757,343

DATED : July 12, 1988

INVENTOR(S) : KANAME NAKATANI, ET AL.

It is certified that error appears in the above-identified patent and that said Letters Patent is hereby corrected as shown below:

IN THE CLAIMS

Column 4, claim 4, line 62, delete "array", insert --matrix--.

Signed and Sealed this

Seventh Day of February, 1989

*Attest:*

DONALD J. QUIGG

*Attesting Officer* *Commissioner of Patents and Trademarks*